US011149139B2

(12) United States Patent
Grein et al.

(10) Patent No.: US 11,149,139 B2
(45) Date of Patent: Oct. 19, 2021

(54) HETEROPHASIC PROPYLENE COPOLYMER

(71) Applicant: SABIC GLOBAL TECHNOLOGIES B.V., Bergen Op Zoom (NL)

(72) Inventors: Christelle Marie Helene Grein, Geleen (NL); Benoit Therese Philippe Lecouvet, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 70 days.

(21) Appl. No.: 16/467,717

(22) PCT Filed: Dec. 12, 2017

(86) PCT No.: PCT/EP2017/082455
§ 371 (c)(1),
(2) Date: Jun. 7, 2019

(87) PCT Pub. No.: WO2018/108928
PCT Pub. Date: Jun. 21, 2018

(65) Prior Publication Data
US 2020/0062942 A1 Feb. 27, 2020

Related U.S. Application Data

(63) Continuation-in-part of application No. PCT/EP2017/082455, filed on Dec. 12, 2017.

(30) Foreign Application Priority Data

Dec. 12, 2016 (EP) ..................... 16203449

(51) Int. Cl.
*C08L 23/12* (2006.01)
*C08L 23/14* (2006.01)

(52) U.S. Cl.
CPC ............. *C08L 23/142* (2013.01); *C08L 23/12* (2013.01); *C08L 2205/025* (2013.01); *C08L 2205/14* (2013.01); *C08L 2205/22* (2013.01); *C08L 2207/02* (2013.01)

(58) Field of Classification Search
CPC .......... C08L 23/16; C08L 23/12; C08L 23/10; C08L 23/0815; C08L 2314/02; C08F 210/16; C08F 2810/10
See application file for complete search history.

(56) References Cited

U.S. PATENT DOCUMENTS

| | | | |
|---|---|---|---|
| 4,282,076 A | 8/1981 | Boynton | |
| 4,399,054 A | 8/1983 | Ferraris et al. | |
| 4,472,524 A | 9/1984 | Albizzati | |
| 4,771,024 A | 9/1988 | Nestlerode et al. | |
| 4,866,022 A | 9/1989 | Arzoumanidis et al. | |
| 5,066,723 A * | 11/1991 | Randall, Jr. ............. | C08L 23/04 525/194 |
| 5,093,415 A | 3/1992 | Brady, III et al. | |
| 6,395,670 B1 | 5/2002 | Morini et al. | |
| 6,825,146 B2 | 11/2004 | Kilty et al. | |
| 2014/0357771 A1* | 12/2014 | Tranninger et al. .... | C08F 2/001 524/210 |
| 2016/0326355 A1* | 11/2016 | Marques Ferreira Custodio ........ | C08L 23/12 |

FOREIGN PATENT DOCUMENTS

| | | |
|---|---|---|
| EP | 0019330 A | 11/1980 |
| EP | 0063654 A1 | 11/1982 |
| EP | 0398698 A2 | 11/1990 |
| EP | 1273595 A1 | 1/2003 |
| EP | 1354901 A1 | 10/2003 |
| EP | 1838741 B1 | 4/2011 |
| EP | 2492309 A1 | 8/2012 |
| WO | 9632426 A1 | 10/1996 |
| WO | 03066828 A2 | 8/2003 |
| WO | 2006010414 A1 | 2/2006 |
| WO | 2006056338 A1 | 6/2006 |
| WO | 2007134851 A1 | 11/2007 |
| WO | 2018108929 A1 | 12/2017 |
| WO | 2018108927 A1 | 6/2018 |
| WO | 2018108932 A1 | 6/2018 |

(Continued)

OTHER PUBLICATIONS

European Search Report for European Application No. 16203449.9; International Filing Date: Dec. 12, 2016; 5 pages.

Hirano et al. "Morphological Analysis of the Tiger Stripe on Injection Molding of Polypropylene/Ethylene-Propylene Rubber/Talc Blends Dependent on Based Polypropylene Design" Journal of Applied Polymer Science, vol. 104, 2007, pp. 192-199.

Hirano et al. "Striped-Pattern Deterioration and Morphological Analysis of Injection Molding Comprising Polypropylene/Ethylene-α-Olefin Rubber Blends. II. Influence of Heating"; Journal of Applied Polymer Science, vol. 108, 2008, pp. 76-84.

(Continued)

*Primary Examiner* — Gregory Listvoyb
(74) *Attorney, Agent, or Firm* — Cantor Colburn LLP

(57) ABSTRACT

The invention relates to a process for the preparation of a final heterophasic propylene copolymer (A) having a final melt flow rate in the range from 65 to 110 dg/min, comprising visbreaking an intermediate heterophasic propylene copolymer (A') having an intermediate melt flow rate, which intermediate melt flow rate is lower than the final melt flow rate, to obtain the final heterophasic propylene copolymer, wherein the intermediate heterophasic propylene copolymer (A') consists of (a) a propylene-based matrix,
(b) a dispersed ethylene-α-olefin copolymer, wherein the sum of the total amount of propylene-based matrix and total amount of the dispersed ethylene-α-olefin copolymer in the intermediate heterophasic propylene copolymer is 100 wt % based on the intermediate heterophasic propylene copolymer.

12 Claims, 1 Drawing Sheet

(56) References Cited

FOREIGN PATENT DOCUMENTS

Figure 1:
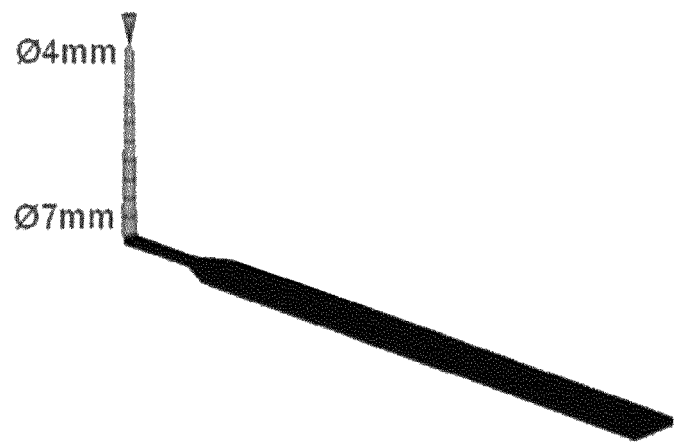

| WO | 2018108935 A1 | 6/2018 |
|---|---|---|
| WO | 2018108936 A1 | 6/2018 |

OTHER PUBLICATIONS

International Search Report; International Application No. PCT/EP2017/082455; International Filing Date: Dec. 12, 2017; dated Feb. 14, 2018;3 pages.

Periodic System of the Elements (Handbook of Chemistry and Physics, 70th Edition, CRC Press, 1989-1990 (1 page).

Ser van der Ven "Polypropylene and Other Polyolefins: Polymerization and Characterization," Studies in Polymer Science, Elsevier (1990) 11 Pages.

Written Opinion; International Application No. PCT/EP2017/082455; International Filing Date: Dec. 12, 2017; dated Feb. 14, 2018; 5 pages.

\* cited by examiner

HETEROPHASIC PROPYLENE COPOLYMER

CROSS REFERENCE TO RELATED APPLICATIONS

This application is a 371 of International Application No. PCT/EP2017/082455, filed Dec. 12, 2017, which is incorporated by reference in its entirety, and which claims priority to European Application Serial No. 16203449.0 filed Dec. 12, 2016.

The present invention relates to a process for the preparation of a heterophasic propylene copolymer by visbreaking an intermediate heterophasic propylene copolymer. The invention further relates to such heterophasic propylene copolymer obtainable or obtained thereby and its applications.

Heterophasic propylene copolymers, also known as impact propylene copolymers or propylene block copolymers, are an important class of polymers due to their attractive combination of mechanical properties, such as impact strength over a wide temperature range and their low cost. These copolymers find a wide range of applications ranging from the consumer industry (for example packaging and housewares), the automotive industry to electrical applications. There are applications that require the heterophasic propylene copolymer to have a relatively high melt flow rate (MFR). Surface aesthetics (tiger stripe rating) and paintability generally deteriorate with the increase in the MFR. Heterophasic propylene copolymers with a higher MFR and good surface aesthetics (good tiger stripe rating) and good paintability are desired.

The term "tiger stripes" as used in this application is meant to refer to matt and gloss variations on the surface of an injection moulded article, which occur because of unstable mould fillings properties of the molten polymer as it is being injected into the mould and formed into the desired shape. Usually these variations can be observed as alternating areas of low and high gloss and/or light or darker colour, wherein the areas usually are substantially perpendicular to the flow direction of an injection moulded article. Tiger stripes may also be referred to as tiger marks or tiger (flow) marking or flow marks. Examples of such appearance and a more scientific discussion on the cause of tiger stripes may be found in Hirano et al., *Journal of Applied Polymer Science* 2007, 104(1), 192-199 and in Hirano et al., *Journal of Applied Polymer Science* 2008, 108(1), 76-84, the contents of which are herewith completely incorporated by reference.

The term "paintability" as used in this application is meant to refer to the resistance to peeling of a painted article when it is scratched.

It is an object of the invention to provide a heterophasic propylene copolymer in which the above-described and/or other problems are solved.

Accordingly, the present invention provides a process for the preparation of a final heterophasic propylene copolymer having a final melt flow rate of 9 to 80 dg/min as measured according to ISO1133 at 230° C. and 2.16 kg, comprising visbreaking an intermediate heterophasic propylene copolymer having an intermediate melt flow rate, which intermediate melt flow rate is lower than the final melt flow rate, to obtain the final heterophasic propylene copolymer, wherein the intermediate heterophasic propylene copolymer consists of (a) a propylene-based matrix, wherein the propylene-based matrix consists of a propylene homopolymer and/or a propylene-α-olefin copolymer which is prepared from at least 90 wt % of propylene and at most 10 wt % of α-olefin, based on the total weight of the propylene-based matrix (b) a dispersed ethylene-α-olefin copolymer, wherein the sum of the total amount of propylene-based matrix and total amount of the dispersed ethylene-α-olefin copolymer in the intermediate heterophasic propylene copolymer is 100 wt % based on the intermediate heterophasic propylene copolymer, wherein the dispersed ethylene α-olefin copolymer has an average rubber particle size $d_{50}$ of 1.0-2.0 μm as determined by scanning electron microscopy and wherein the intermediate heterophasic propylene copolymer has a fraction insoluble in p-xylene at 25° C. (CXI) in the range of 65 to 77 wt % based on the intermediate heterophasic propylene copolymer a fraction soluble in p-xylene at 25° C. (CXS) in the range of 23 to 35 wt. % based on the intermediate heterophasic propylene copolymer, wherein the CXS has an intrinsic viscosity of at least 2.6 dl/g, and wherein the sum of the total amount of CXI and total amount of CXS in the intermediate heterophasic propylene copolymer is 100 wt. %, wherein the ratio of the intrinsic viscosity of the CXS (IV-CXS) to the intrinsic viscosity of the CXI (IV-CXI) is in the range from 1.5 to 4.5 dl/g, wherein the intrinsic viscosity is determined according to DIN EN ISO 1628-1 and 1628-3.

According to the invention, an intermediate heterophasic copolymer having a relatively high ratio of IV-CXS to IV-CXI and a specific average rubber particle size is visbroken to obtain a final heterophasic propylene copolymer having a higher melt flow rate. It was surprisingly found that by shifting these intermediate heterophasic copolymers to a higher melt flow rate, the final heterophasic propylene copolymer has a high impact strength in combination with an acceptable flexural modulus (stiffness), a low warpage and good surface aesthetics such as good tiger stripe rating and/or a good paintability. Such heterophasic propylene copolymers of the invention may suitably be used for the production of (injection molded) articles, such as automotive exterior parts, such as bumpers and body panels. A good paintability is desired for painted articles, whereas a good tiger stripe rating is desired for unpainted articles.

It was found that the size of the rubber particles of the dispersed phase of the intermediate heterophasic copolymer used according to the invention decreases by the vis-breaking when the ratio of IV-CXS to IV-CXI of the intermediate heterophasic copolymer as described above is within the range of 1.5 to 4.5. It is believed that the decrease in the size of the rubber particles by the vis-breaking leads to the desirable properties of the obtained heterophasic propylene copolymer.

Intermediate Heterophasic Propylene Copolymer

Heterophasic propylene copolymers are generally prepared by polymerization of propylene (or propylene and α-olefin) in the presence of a catalyst and subsequent polymerization of an ethylene-α-olefin mixture.

The intermediate heterophasic propylene copolymers employed in the process according to present invention can be produced using any conventional technique known to the skilled person, for example multistage process polymerization, such as bulk polymerization, gas phase polymerization, slurry polymerization, solution polymerization or any combinations thereof. Any conventional catalyst systems, for example, Ziegler-Natta or metallocene may be used. Such techniques and catalysts are described, for example, in WO06/010414; *Polypropylene and other Polyolefins*, by Ser van der Ven, Studies in Polymer Science 7, Elsevier 1990; WO06/010414, U.S. Pat. Nos. 4,399,054 and 4,472,524. Preferably, the intermediate heterophasic propylene copolymer is made using Ziegler-Natta catalyst.

Catalyst System

In the process of the invention, step a) and/or step b) may be performed by contacting propylene and the optional α-olefin with a catalyst system, for example a catalyst system which comprises a Ziegler-Natta catalyst and at least one external electron donor, which external electron donor is preferably chosen from the group of a compound having a structure according to Formula III $(R^{90})_2N—Si(OR^{91})_3$, a compound having a structure according to Formula IV: $(R^{92})Si(OR^{93})_3$ and mixtures thereof wherein each of $R^{90}$, $R^{91}$, $R^{92}$ and $R^{93}$ groups are each independently a linear, branched or cyclic, substituted or unsubstituted alkyl having between 1 and 10 carbon atoms, preferably wherein $R^{90}$, $R^{91}$, $R^{92}$ and $R^{93}$ groups are each independently a linear unsubstituted alkyl having between 1 and 8 carbon atoms, for example ethyl, methyl or n-propyl, for example diethylaminotriethoxysilane (DEATES), n-propyl triethoxysilane, (nPTES), n-propyl trimethoxysilane (nPTMS); and organosilicon compounds having general formula Si $(OR^a)_{4-n}R^b_n$, wherein n can be from 0 up to 2, and each of $R^a$ and $R^b$, independently, represents an alkyl or aryl group, optionally containing one or more hetero atoms for instance O, N, S or P, with, for instance, 1-20 carbon atoms; such as diisobutyl dimethoxysilane (DiBDMS), t-butyl isopropyl dimethyxysilane (tBuPDMS), cyclohexyl methyldimethoxysilane (CHMDMS), dicyclopentyl dimethoxysilane (DCPDMS) or di(iso-propyl) dimethoxysilane (DiPDMS). More preferably, the external electron donor is chosen from the group of di(iso-propyl) dimethoxysilane (DiPDMS), diethylaminotriethoxysilane (DEATES), n-propyl triethoxysilane, (nPTES), n-propyl trimethoxysilane (nPTMS) and mixtures thereof.

Preferably, step a) and b) of the process of the invention are performed by contacting propylene and the optional α-olefin with the same catalyst system.

Such organosilicon compounds mentioned above are known in the art (for instance as disclosed in documents WO2006/056338A1, EP1838741B1, U.S. Pat. No. 6,395,670B1, EP398698A1, WO96/32426A).

Preferably, the catalyst system used in step I) is obtained by a catalyst preparation process comprising the steps of:
providing a magnesium-based support;
optionally activating said magnesium-based support using an activator;
contacting said magnesium-based support with a Ziegler-Natta type catalytic species, and optionally one or more internal electron donors to yield a procatalyst, and
contacting said procatalyst with a co-catalyst and at least one external electron donor;
More preferably, the catalyst system is obtained by
a catalyst preparation process comprising the steps of:
A) providing a procatalyst obtainable via a process comprising the steps of:
i) contacting a compound $R^4_zMgX^4_{2-z}$ with an alkoxy- or aryloxy-containing silane compound to give a first intermediate reaction product, being a solid $Mg(OR^1)_xX^1_{2-x}$, wherein: $R^4$ is the same as $R^1$ being a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms and preferably has between 1 and 20 carbon atoms; $X^4$ and $X^1$ are each independently selected from the group of consisting of fluoride (F—), chloride (Cl—), bromide (Br—) or iodide (I—), preferably chloride; z is in a range of larger than 0 and smaller than 2, being 0<z<2;

ii) optionally contacting the solid $Mg(OR^1)_xX^1_{2-x}$ obtained in step i) with at least one activating compound selected from the group formed of activating electron donors and metal alkoxide compounds of formula $M^1(OR^2)_{v-w}(OR^3)_w$ or $M^2(OR^2)_{v-w}(R^3)_w$, to obtain a second intermediate product; wherein $M^1$ is a metal selected from the group consisting of Ti, Zr, Hf, Al or Si; $M^2$ is a metal being Si; v is the valency of $M^1$ or $M^2$; $R^2$ and $R^3$ are each a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms, and preferably has between 1 and 20 carbon atoms;

iii) contacting the first or second intermediate reaction product, obtained respectively in step i) or ii), with a halogen-containing Ti-compound and optionally an internal electron donor to obtain said procatalyst;

B) contacting said procatalyst with a co-catalyst and the at least one external electron donor to form a catalyst Preferably in step i) of said process, the compound of formula $R^4_zMgX^4_{2-z}$ is a phenyl or butyl Grignard reagent (PhMgCl or BuMgCl), more preferably a BuMgCl.

The aluminum/external donor molar ratio in the catalyst system preferably is between 0.1 and 200; more preferably between 1 and 100. In a Ti-based catalyst, the Si/Ti molar ratio in the catalyst system can range from 0.1 to 40, preferably from 0.1 to 20, even more preferably from 1 to 20 and most preferably from 2 to 10.

Some examples of Ziegler-Natta (pro)catalysts and their preparation method can be found in EP 1 273 595, EP 0 019 330, U.S. Pat. No. 5,093,415, Example 2 of U.S. Pat. Nos. 6,825,146, 4,771,024 column 10, line 61 to column 11, line 9, WO03/068828, U.S. Pat. No. 4,866,022, WO96/32426A, example I of WO 2007/134851 A1, all of which are hereby incorporated by reference.

The procatalyst thus prepared can be used in polymerization of olefins using an external donor and a co-catalyst.

The catalyst system according to the present invention includes a co-catalyst. As used herein, a "co-catalyst" is a term well-known in the art in the field of Ziegler-Natta catalysts and is recognized to be a substance capable of converting the procatalyst to an active polymerization catalyst. Generally, the co-catalyst is an organometallic compound containing a metal from group 1, 2, 12 or 13 of the Periodic System of the Elements (Handbook of Chemistry and Physics, 70th Edition, CRC Press, 1989-1990). The co-catalyst may include any compounds known in the art to be used as "co-catalysts", such as hydrides, alkyls, or aryls of aluminum, lithium, zinc, tin, cadmium, beryllium, magnesium, and combinations thereof. The co-catalyst may be a hydrocarbyl aluminum co-catalyst as are known to the skilled person. Preferably, the cocatalyst is selected from trimethylaluminium, triethylaluminum, triisobutylaluminum, trihexylaluminum, di-isobutylaluminum hydride, tri-octylaluminium, dihexylaluminum hydride and mixtures thereof, most preferably, the cocatalyst is triethylaluminium (abbreviated as TEAL).

The molar ratio of aluminum to titanium may be from about 5:1 to about 500:1 or from about 10:1 to about 200:1 or from about 15:1 to about 150:1 or from about 20:1 to about 100:1. The molar ratio of aluminum to titanium is preferably about 45:1. The aluminium/external donor molar ratio in the polymerization catalyst system preferably is from 0.1 to 200; more preferably from 1 to 100.

The internal electron donor can be any compound known in the art to be used as internal electron donor. Suitable examples of internal donors include aromatic acid esters, such as monocarboxylic acid ester or dicarboxylic acid esters (e.g. ortho-dicarboxylic acid esters such as phthalic acid esters) or benzoic acid esters, for example ethyl benzoate; (N-alkyl)amidobenzoates, 1,3-diethers, 1,5-diethers, silyl esters, fluorenes, succinates and/or combinations thereof.

It is preferred to use so-called phthalate free internal donors because of increasingly stricter government regulations about the maximum phthalate content of polymers. This leads to an increased demand in phthalate free catalyst compositions. In the context of the present invention, "essentially phthalate-free" of "phthalate-free" means having a phthalate content of less than for example 150 ppm, alternatively less than for example 100 ppm, alternatively less than for example 50 ppm, alternatively for example less than 20 ppm, for example of 0 ppm based on the total weight of the catalyst.

The molar ratio of the internal donor relative to the magnesium can be from 0.02 to 0.5. Preferably, this molar ratio is preferably between 0.05 and 0.2.

The intermediate heterophasic propylene copolymer may be prepared by a process comprising
polymerizing propylene and optional α-olefin in the presence of a catalyst system to obtain the propylene-based matrix and
subsequently polymerizing ethylene and α-olefin in the propylene-based matrix in the presence of a catalyst system to obtain the dispersed ethylene-α olefin copolymer.

These steps are preferably performed in different reactors. The catalyst systems for the first step and for the second step may be different or same.

The intermediate heterophasic propylene copolymer consists of a propylene-based matrix and a dispersed ethylene-α-olefin copolymer. The propylene-based matrix typically forms the continuous phase in the heterophasic propylene copolymer.

The propylene-based matrix consists of a propylene homopolymer and/or a propylene-α-olefin copolymer which is prepared from at least 90 wt % of propylene and up to 10 wt % of α-olefin, for example which is prepared from at least 92 wt % of propylene and up to 8 wt % of α-olefin, for example which is prepared from of at least 95 wt % of propylene and up to 5 wt % of α-olefin, for example which is prepared from at least 97 wt % of propylene and up to 3 wt % of α-olefin, for example ethylene, based on the total weight of the propylene-based matrix. Typically, the amount of ethylene therein can be measured by FTIR (Fourier Transform Infrared Spectroscopy).

Preferably, the α-olefin used to prepare the propylene-α-olefin copolymer is selected from the group of α-olefins having 2 or 4-10 carbon atoms, for example ethylene, 1-butene, 1-pentene, 4-methyl-1-pentene, 1-hexene, 1-heptene or 1-octene, and is preferably ethylene.

Preferably, the propylene-based matrix consists of a propylene homopolymer.

The melt flow rate (MFR) of the propylene-based matrix, $MFR_{R1}$ may be for example at least 0.1 dg/min, at least 0.2 dg/min, at least 0.3 dg/min, at least 0.5 dg/min, at least 1 dg/min, at least 1.5 dg/min, and/or for example at most 50 dg/min, for example at most 40 dg/min, at most 30 dg/min, at most 25 dg/min, at most 20 dg/min, measured according to ISO1133 (2.16 kg/230° C.). Preferably, the $MFR_{R1}$ is in the range of 10 to 50 dg/min, for example in the range of 10 to less than 40 dg/min or of 15 to 35 dg/min, measured according to ISO1133 (2.16 kg/230° C.).

Preferably, the intrinsic viscosity of the fraction insoluble in p-xylene at 25° C. (IV-CXI) of the intermediate heterophasic propylene copolymer is at least 0.50, for example at least 1.0, for example at least 1.4 and/or at most 3.5, for example at most 2.5, for example at most 2.0. For example, the intrinsic viscosity of the fraction insoluble in p-xylene at 25° C. (CXI) of the intermediate heterophasic propylene copolymer is in the range of 0.50 to 3.5, for example in the range from 1.0 to 2.5, for example in the range from 1.4 to 2.0. For purpose of the invention, the intrinsic viscosity is determined according to DIN EN ISO 1628-1 and 1628-3.

Besides the propylene-based matrix, the heterophasic propylene copolymer also comprises a dispersed ethylene-α-olefin copolymer.

The amount of ethylene in the ethylene-α-olefin copolymer of the intermediate heterophasic propylene copolymer as measured by FTIR (Fourier Transform Infrared Spectroscopy) is from 30 to 65 wt %, for example at least 35 wt %, for example at least 40 wt % and/or at most 60, for example at most 55 wt %. Preferably, the amount of ethylene in the ethylene-α-olefin copolymer of the intermediate heterophasic propylene copolymer as measured by FTIR (Fourier transform infrared spectroscopy) is from 40 to 55 wt %. The amount of ethylene in the dispersed ethylene-α-olefin copolymer as measured by FTIR (Fourier transform infrared spectroscopy) in the intermediate heterophasic propylene copolymer may herein be sometimes referred as RCC2.

The α-olefin in the ethylene-α-olefin copolymer is preferably chosen from the group of α-olefins having 3 to 8 carbon atoms. Examples of suitable α-olefins having 3 to 8 carbon atoms include but are not limited to propylene, 1-butene, 1-pentene, 4-methyl-1-pentene, 1-hexen, 1-heptene and 1-octene. More preferably, the α-olefin in the ethylene-α-olefin copolymer is chosen from the group of α-olefins having 3 to 4 carbon atoms and any mixture thereof, more preferably the α-olefin is propylene, in which case the ethylene-α-olefin copolymer is ethylene-propylene copolymer.

The dispersed ethylene α-olefin copolymer in the intermediate heterophasic propylene copolymer has an average rubber particle size $d_{50}$ of 1.0-2.0 μm, for example 1.1-1.7 μm, as determined by scanning electron microscopy (SEM).

The intermediate heterophasic propylene copolymer used in the process of the invention has a fraction soluble in p-xylene at 25° C. (CXS) measured according to ISO 16152:2005 of at least 23 wt %, preferably at least 25 wt % and/or at most 35 wt %, for example at most 32 wt % based on the intermediate heterophasic propylene copolymer. For example, the intermediate heterophasic propylene copolymer used in the process of the invention has a fraction soluble in p-xylene at 25° C. (CXS) measured according to ISO 16152:2005 in the range from 23 to 35 wt %, preferably in the range from 25 to 32 wt % based on the intermediate heterophasic propylene copolymer.

The fraction of the intermediate heterophasic propylene copolymer insoluble in p-xylene at 25° C. (CXI) is the difference of 100 wt. % minus the weight percentage of the CXS fraction. Therefore, the CXS is at most 77 wt %, preferably at most 75 wt % and/or at least 65 wt %, for example at least 68 wt % based on the intermediate heterophasic propylene copolymer.

The fraction of the intermediate heterophasic propylene copolymer soluble in p-xylene at 25° C. (CXS) has an intrinsic viscosity (IV-CXS) as measured according to DIN EN ISO 1628-1 and -3 of at least 2.6 dl/g and for example at most 4.7 dl/g.

The ratio of the intrinsic viscosity of the CXS (IV-CXS) to the intrinsic viscosity of the CXI (IV-CXI) is in the range from 1.5 to 4.5 dl/g, wherein the intrinsic viscosity is determined according to DIN EN ISO 1628-1 and -3. For example, the ratio of the intrinsic viscosity of the CXS (IV-CXS) to the intrinsic viscosity of the CXI (IV-CXI) is at least 1.5, for example at least 1.6 and/or at most 4.5, for example at most 2.7 dl/g. For example, the ratio of the intrinsic viscosity of the CXS (IV-CXS) to the intrinsic viscosity of the CXI (IV-CXI) is in the range from 1.6 to 2.7 dl/g.

The final melt flow rate (MFR) as defined herein is the MFR of the final heterophasic propylene copolymer (the heterophasic propylene copolymer obtained after vis-breaking of the intermediate heterophasic propylene copolymer). The intermediate melt flow rate (MFR) as defined herein is the MFR of the intermediate heterophasic propylene copolymer.

The intermediate heterophasic propylene copolymer has an intermediate MFR which is lower than the final MFR. The intermediate MFR may be for example at least 2.0 dg/min, for example at least 3.0 dg/min, for example at least 4.0 dg/min and/or for example at most 8.0, for example at most 6.5, for example at most 5.0 dg/min as measured according to ISO1133 (2.16 kg/230° C.). Preferably, the intermediate MFR is in the range of 3.0 to 8.0 dg/min, measured according to ISO1133 (2.16 kg/230° C.).

Preferably, the intermediate heterophasic propylene copolymer has molecular weight distribution ($M_w/M_n$) in the range from 5.8 to 10.0, for example in the range from 6.0 to 9.5, wherein Mw stands for the weight average molecular weight and Mn stands for the number average molecular weight, both of which are measured by SEC analysis with universal calibration according to ISO 16014-1(4): 2003.

Preferably, in the intermediate heterophasic propylene copolymer according to the invention, the α-olefin in the ethylene-α-olefin copolymer is selected from the group of 3 to 10 carbon atoms, for example propylene, butylene, hexene and octene, preferably the α-olefin is propylene.

Properties of Intermediate Heterophasic Propylene Copolymer

Preferably, the intermediate heterophasic propylene copolymer has an Izod impact strength according to ISO 180 4A (test geometry: 65*12.7*3.2 mm, notch 45° according to ISO 37/2 parallel orientation) of at least 65 kJ/m² at 23° C. and/or at least 7 kJ/m² at −20° C.

In some embodiments, the intermediate heterophasic propylene copolymer has a flexural modulus of at least 800, preferably at least 850 MPa, as determined at 23° C. in parallel direction according to ASTM D790 Procedure B on a sample of 65×12.7×3.2 mm.

Preferably, the intermediate heterophasic propylene copolymer has a warpage below 1.15 as determined by measuring shrinkages of injection molded samples of 65×65×3.2 mm according to ISO 294-4 in a direction parallel to the flow direction and a direction perpendicular to the flow direction after 24 h at 23° C. after the moulding, and calculating the warpage which is the ratio of shrinkage in the parallel and perpendicular directions.

Visbreaking

The term "visbreaking" is well known in the field of the invention. It is also sometimes referred to as (peroxide) shifting or controlled rheology. For example, methods of visbreaking polypropylene have been disclosed in U.S. Pat. No. 4,282,076 and EP 0063654.

Several different types of chemical reactions which are well known, can be employed for visbreaking propylene polymers. An example is exposure to powerful oxidizing agents. It is preferred however that visbreaking is carried out using a peroxide. Such materials, at elevated temperatures, initiate a free radical chain reaction resulting in beta-scission of the polypropylene molecules. The visbreaking may be carried out directly after polymerisation and removal of unreacted monomer and before pelletisation (during extrusion in an extruder wherein shifting of the intermediate heterophasic propylene copolymer occurs). However, the invention is not limited to such an embodiment and visbreaking may also be carried out on already pelletised polypropylene for example by melt-mixing the pelletised polypropylene with for example peroxide.

Examples of suitable peroxides are known to the person skilled in the art and include organic peroxides, for example organic peroxides which are commercially available, such as Luperco®802PP40 (di(tert-butylperoxyisopropylbenzene)).

It can easily be determined by the person skilled in the art through routine experimentation how much peroxide should be used to obtain the final heterophasic polypropylene copolymer having the desired final melt flow rate. This also depends on the half-life of the peroxide and on the conditions used for the melt-mixing.

Typically, the amount of peroxide used will lie in the range of 0.02 to 0.5 wt %, for example 0.05 to 0.2 wt %, for example 0.1 to 0.2 wt %, based on melt flow rate of the intermediate heterophasic propylene copolymer.

Final Heterophasic Propylene Copolymer

The heterophasic propylene copolymer obtained after the vis-breaking step (sometimes referred herein as the final heterophasic propylene copolymer) has a final melt flow rate of 9 to 80 dg/min. Preferably, the final melt flow rate of the final heterophasic propylene copolymer is at least 10 dg/min, for example at least 15 dg/10 min or at least 25 dg/10 min, and/or at most 80 dg/min, at most 70 dg/min or at most 50 dg/min, for example at most 45 dg/min, for example less than 40 dg/min (ISO 1133, 230° C., 2.16 kg). The final melt flow rate of the final heterophasic propylene copolymer may for example be in the range from 9 to 45 dg/min, for example in the range from 15 to 45 dg/min or for example in the range from 9 to less than 40 dg/min as determined using ISO 1133 (230° C., 2.16 kg).

In order to achieve good mechanical as well as aesthetic properties, for example the tiger stripe rating of the final heterophasic propylene copolymer as compared to the intermediate heterophasic propylene copolymer, the ratio of the final MFR to the intermediate MFR is at least 1.1, for example at least 1.5, for example at least 2, for example at least 3.5 and/or for example at most 20, for example at most 15, for example at most 10, for example at most 8. For example, the shifting ratio (which is the ratio of the final MFR to the intermediate MFR) is in the range from 1.5 to 20, more preferably from 2 to 10, even more preferably from 3.5 to 10.

For example, the shifting ratio may be chosen such that it complies with the following formula:

$$0.0011x^2 - 0.011x + 1 \leq \text{shifting ratio} \leq -0.0009x^2 + 0.1963x + 1 \quad \text{(formula 1)}$$

wherein x stands for the melt flow rate of the final heterophasic propylene copolymer obtained after visbreaking of the intermediate heterophasic propylene copolymer, wherein the shifting ratio is the melt flow rate of the final heterophasic propylene copolymer (final melt flow rate) divided by the melt flow rate of the intermediate heterophasic propylene copolymer (intermediate melt flow rate).

Preferably, with such shifting ratio of formula (1) above, the intermediate heterophasic propylene copolymer has a propylene-based matrix with a melt flow rate of at most 70 dg/min, for example of at most 50 dg/min as determined in accordance with ISO1133 (230° C., 2.16 kg).

According to the invention, the average rubber particle size may be the same for the final and the intermediate heterophasic propylene copolymer or may be decreased by vis-breaking. Accordingly, the dispersed ethylene α-olefin copolymer of the final heterophasic propylene copolymer has an average rubber particle size as determined by scanning electron microscopy (final average rubber particle size) lower than the average rubber particle size of the dispersed ethylene α-olefin copolymer of the intermediate heterophasic propylene copolymer (intermediate average rubber particle size). For example, the intermediate average rubber particle size is at least 0.1 μm higher than the final average rubber particle size.

Preferably, the impact strength of the final heterophasic propylene copolymer is at least 35 kJ/m$^2$ as determined at 23° C. according to ISO 180 4A (test geometry: 65*12.7*3.2 mm, notch 45° according to ISO 37/2 parallel orientation). For example, the impact strength of the final heterophasic propylene copolymer is at most 70 kJ/m$^2$.

For example, the final heterophasic propylene copolymer according to the invention has a flexural modulus of at least 650, for example at least 700, for example at least 740 MPa (740 N/mm$^2$) and/or for example at most 1500 MPa as determined at 23° C. in parallel direction according to ASTM D790 Procedure B on a sample of 65×12.7×3.2 mm.

For example, the final heterophasic propylene copolymer according to the invention has a warpage of at most 1.2, for example at most 1.1 and/or for example at least 0.80, for example at least 0.90 as determined by measuring shrinkages of injection molded samples of 65×65×3.2 mm according to ISO 294-4 in a direction parallel to the flow direction and a direction perpendicular to the flow direction after 24 h at 23° C. after the moulding, and calculating the warpage which is the ratio of shrinkage in the parallel and perpendicular directions.

Additives

Additives such as stabilizers may be added before, during and/or after the vis-breaking step. The additives may include stabilizers, e.g. heat stabilizers, anti-oxidants, UV stabilizers; α-nucleating agents; colorants, like pigments and dyes; clarifiers; surface tension modifiers; lubricants; flame-retardants; mould-release agents; flow improving agents; plasticizers; anti-static agents etc.

The skilled person can readily select any suitable combination of additives and additive amounts without undue experimentation. The amount of the additives depends on their type and function and typically is from 0 to about 5 wt %. The amount of the additives may e.g. be from about 0.1 to about 3 wt %; or from about 0.2 to about 1 wt % with respect to the intermediate heterophasic propylene copolymer.

Therefore, in another aspect, the invention relates to a composition comprising the heterophasic propylene copolymer of the invention, for example wherein the amount of heterophasic propylene copolymer of the invention is at least 95 wt % based on the composition, for example at least 97, for example at least 99, for example at least 99.8, for example at least 99.9, for example 100 wt % based on the composition.

Additives used in a small amount, e.g. less than 0.5 wt % based on the heterophasic propylene copolymer, have no significant influence on the MFR of the composition comprising the heterophasic propylene copolymer. Therefore, the MFR of the heterophasic propylene copolymer can be determined by the measurement of the MFR of a composition comprising the heterophasic propylene copolymer and additives.

Further Aspects

The present invention further relates to the final heterophasic propylene copolymer obtainable or obtained by the process of the invention. Such heterophasic propylene copolymers show a medium to high flow in combination with a high impact strength in combination with an acceptable flexural modulus (stiffness), a low warpage and good surface aesthetics such as good tiger stripe rating and/or a good paintability. Such heterophasic propylene copolymers of the invention may suitably be used for the production of (injection molded) articles, such as automotive exterior parts, such as bumpers and body panels.

The present invention further relates to a composition comprising the heterophasic propylene copolymer obtainable or obtained by the process of the invention and additives. Preferably, the amount of the heterophasic propylene copolymer in the composition is 95-100 wt %.

The invention further relates to an article comprising the heterophasic propylene copolymer of the invention. Suitable examples of processing techniques to make such article include injection moulding, rotational moulding, compression moulding, extrusion and extrusion compression moulding.

In particular, the invention relates to an article comprising the composition according to the invention, wherein the article is for example made by one of the processing techniques mentioned above. Injection moulding is widely used to produce articles such as for example pails, containers, automotive exterior parts like bumpers and body panels, automotive interior parts like instrument panels, or automotive parts under the bonnet.

In another aspect therefore, the invention relates to the use of the heterophasic propylene copolymer of the invention for the preparation of an article, for example an injection molded article, for example an automotive part, for example an (injection molded) automotive exterior part or an (injection molded), automotive interior part, wherein the article is an (injection molded) automotive interior or exterior part, for example a bumper, body panel, a fascia, a fender air dam, an air spoiler, a front grill, a door garnish, an instrument panel, a dashboard or a glove box.

It is noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

The invention is now elucidated by way of the following examples, without however being limited thereto.

EXAMPLES

MFR

The melt flow rate (MFR) was determined according to the International Organization for Standardization (ISO) test standards ISO 1133 at 230° C. under a load of 2.16 kilogram (kg).

CXS and CXI

The amount of xylene soluble fraction (CXS) in the heterophasic propylene copolymer was determined according to ISO 16152:2005, which specifies a method for determining the mass fraction of a sample which is soluble in p-xylene at 25° C. CXS represents the content of the ethylene-α-olefin elastomer in the heterophasic propylene copolymer. The fraction of the heterophasic propylene copolymer insoluble in p-xylene at 25° C. (CXI) was determined as the difference of 100 wt % minus the weight percentage of the CXS fraction.

IV-CXS and IV-CXI

The intrinsic viscosities of the xylene soluble fraction (IV-CXS) and of the xylene insoluble fraction (IV-CXI) were determined from the measured amounts of xylene soluble matter (CXS) and xylene insoluble matter (CXI), respectively, according to according to DIN EN ISO 1628-1 and -3. The IV ratio is defined as the ratio of IV-CXS to IV-CXI.

RCC2

RCC2 is the ethylene content in the dispersed ethylene α-olefin copolymer of the heterophasic propylene copolymer. RCC2 was measured with Fourier transform infrared spectroscopy (FTIR), which was calibrated using $^{13}$C-NMR according to known procedures.

Rubber Particle Size Distribution Analysis

The volume average size of the rubber particles of the dispersed ethylene α-olefin copolymer, represented by the $d_{50}$ parameter, was obtained by digital image analysis of scanning electron micrographs. Scanning electron microscopy (SEM) was performed on injection molded plaques. Samples of the injection molded plaques were trimmed from surface to bulk at −120° C. The trimmed blocks were stained for 24 hours in $RuO_4$ solution. After staining, sections with a thickness of 70 nm were obtained. The remaining blocks weree fixed into a SEM sample holder and coated with a conductive Ir layer. Imaging was done in a FEI Versa 3D FEGSEM at an acceleration voltage of 5 kV. The resulting micrographs were digitally analyzed using Olympus stream software using the assumptions and mathematical relations as described in D. Sahagian, A. Proussevitch: "3D particle size distributions from 2D observations: stereology for natural applications." Journal of Volcanology and geothermal Research, 84 (1998) 173-196, to characterize the dispersed rubber phase in terms of its $d_{10}$, $d_{50}$, $d_{90}$ and distribution width. Outside the area where the sample shows particles, reference material was present which has a certain color ($C_{ref}$). The part for the particles that was taken into account for the measurements was determined by measuring the actual color of the particle pixel ($C_{particle}$) and subtracting from this value $C_{ref}$. A pixel lies within the particle, when the $C_{particle}$ is larger than $C_{ref}*1.05$. In this way noise which may be present in the reference material is filtered out and not taken into account in determining the particle size. The particle size is the sum of all pixels which have a $C_{particle} > C_{ref}*1.05$.

$M_w/M_n$

The procedure of ISO 16014-1(4): 2003 was followed to measure Mn, Mw and Mz of the inventive ICP using SEC-DV with universal calibration. SEC measurements were performed on Polymer Laboratories PL-GPC220 (Agilent Technologies, Church Stretton, United Kingdom) three coupled columns type PLgel Olexis (Agilent). The samples were dissolved in 1,2,4-trichlorobenzene (TCB) stabilized with 1 g/L butylhydroxytoluene (BHT) at concentrations of 0.3-1.3 mg/mL for 4 hours at 160° C. and filtered through 1.2 μm filter prior to injection. 300 μL of polymer solution was injected and the mobile phase flow rate was 1.0 ml/min. Detectors used were built-in refractive index detector and a differential viscometer. For setting up the universal calibration line polyethylene standards were used.

Mechanical Properties

The impact strength was determined by measuring the Izod impact strength at −20° C. and 23° C. according to ISO 180 4A, Test geometry: 65*12.7*3.2 mm, notch 45° according to ISO 37/2 in parallel orientation.

The flexural modulus and the flexural strength were determined at 23° C. according to the ASTM D790 Procedure B. ASTM D790 parallel measurements were done on 65×12.7×3.2 mm cut samples.

Shrinkage measurements were determined according to ISO 294-4 (Apr. 23, 1990). The sample size used was 65×65×3.2 mm with measurements taken 24 h at 23° C. after moulding and after 1 h at 90° C. Parallel shrinkage indicated is parallel to the flow direction, perpendicular is the shrinkage in cross flow direction. Shrinkage was measured on 5 samples and averaged.

Warpage measurements were determined by the ratio of shrinkage in the parallel and perpendicular directions. The measurements were taken 24 h at 23° C. after moulding and after extra 1 h at 90° C.

Paintability Assessment

The paintability assessment tests how well paint adheres to a material. To this end, paint plaques A5 with dimensions 210×148×3.2 mm were injection molded on Arburg 320T and sent to Wörwag (Karl Wörwag GmbH & Co. KG in Stuttgart, Germany) for painting and paint testing. At Wörwag, the power-wash of plaques with 1% of Divinol Spritzreiniger 1262 solution was performed, following by flame treatment with propane according to Daimler flaming conditions. Activated plaques were painted first with Hydrobasecoat iridiumsilber paint (110086 R2342) and then with solvent clear coat (107062 R3209), both provided by Wörwag. Paint adhesion pressure-washer test PWT (Steam Jet Test, section 4.7 of the DBL 5416 protocol) was performed on initial paint plaques and 24 h after temperature-changing-test (TWT, Temperature-Wechsel-Test). Steam jet test: water temperature: 60° C.; angle: 90°; distance sample-nozzle: 100 mm; spraying time: 60 sec. TWT was performed on plaques according to the paragraph 3.2.11 of the DBL 5416 protocol. Test duration: 3 cycles; 1 cycle consisting of 15 h 105° C.; 30 min. 23±2° C.; 8 h-40° C.; 30 min. 23±2° C. Assessment is performed 1 and 24 h after the end of the test. Five paint plaques with five "Ritzstichel" scratches on each plaque were paint tested from initial plaques and plaques after TWT treatment. Based on the results of the DBL 5416, the different materials were compared with each other using rating -- to ++, where a paintability rating of -- is considered as worst performing and a rating of ++ is considered as best performing.

Tiger Stripe Rating

Figure 2:
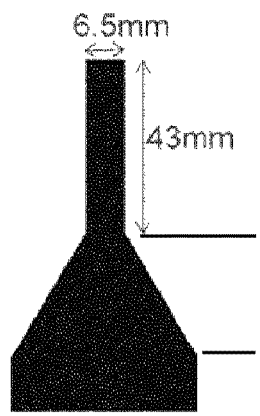
Figure 3:
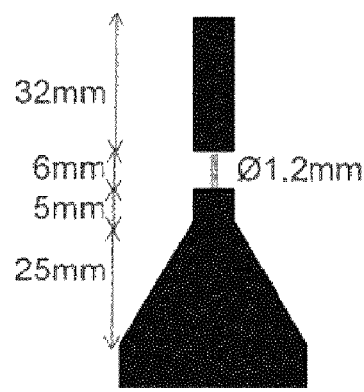

Compositions were injection moulded into two types of ruler-shaped test specimens using the feeding system and the mold as illustrated in FIG. 1. The details of the two types of molds are illustrated in FIGS. 2 and 3. The two types of molds have respectively a fan gate (FIG. 2) and a pin-point gate (FIG. 3).

FIG. 1 (FIG. 1) illustrates the feeding system and the mold. The molten sample was injected through a sprue with an upper end having a diameter of 4 mm and a lower end having a diameter of 7 mm. The lower end of the sprue merges with a rectangular channel of the mold, the rectangular channel having a width of 6.5 mm and a depth of 3 mm.

FIG. 2 (FIG. 2) illustrates one type of a gate system called a fan gate. After the rectangular channel having a length of 43 mm, a fan shaped part follows having a length of 25 mm. Along the length of the fan shaped part, the width changes from 6.5 mm to 30 mm and the thickness changes from 3 mm to 2 mm. After the fan shaped part, an elongated part follows having a width of 30 mm and a thickness of 3 mm.

FIG. 3 (FIG. 30 illustrates another type of a gate system called a pin-point gate. The pin-point gate is identical to the fan gate of FIG. 2 except that the rectangular channel has three regions: a first region having a length of 32 mm and a width of 6.5 mm, followed by a second region having a length of 6 mm and a width of 1.2 mm, followed by a third region having a length of 5 mm and a width of 6 mm.

The melt temperature during the injection was set to 240° C. and the mold set to room temperature. Three different screw speeds were used according to Table 1. Specimens having a smooth side and a textured side were manufactured.

TABLE 1

Injection molding conditions of the tiger stripe rulers

| Condition | Screw speed injection [mm/s] | Flow rate [cm³/s] | Injection time [s] |
|---|---|---|---|
| Low speed | 20 | 14.1 | 2.49-2.51 |
| Medium speed | 50 | 35.3 | 0.99-1.0 |
| High speed | 160 | 113.1 | 0.38-0.39 |

After moulding, each of the specimens was visually observed for occurrence of tiger stripes on its smooth side and textured side. The quality of the surface was evaluated on a scale of 1 to 10, with 10 being the best, as described in Table 2.

The average tiger stripe rating is defined as the numerical average of the individual tiger stripe ratings for each of the test specimens manufactured at low, medium and high speed, manufactured with the pin-gate and the fan-gate and measured on the smooth and on the textured surface. Hence, the average tiger stripe rating as defined herein is the average of 12 individual tiger stripe measurements.

TABLE 2

| 1 | very sharp transition between glossy and dull sections visible seen from any angle |
|---|---|
| 2 | sharp transitions between glossy and dull sections seen from any angle |
| 3 | very visible transitions between glossy and dull sections seen from any angle |
| 4 | visible transitions between glossy and dull sections seen from any angle |
| 5 | less visible transitions between glossy and dull sections seen from any angle |
| 6 | visible transitions between glossy and dull sections seen from a specific angle only |
| 7 | less visible transitions between glossy and dull sections seen from a specific angle only |
| 8 | no transitions between glossy and dull sections visible and surface appearance inhomogeneous |
| 9 | no transitions between glossy and dull sections visible and surface appearance homogeneous |
| 10 | no transitions between glossy and dull sections visible and surface is perfect |

Experimental

Catalyst A

Catalyst A is prepared according to the method described in U.S. Pat. No. 5,093,415 of Dow, hereby incorporated by reference. This patent discloses an improved process to prepare a catalyst including a reaction between titanium tetrachloride, diisobutyl phthalate, and magnesium diethoxide to obtain a solid material. This solid material is then slurried with titanium tetrachloride in a solvent and phthaloyl chloride is added. The reaction mixture is heated to obtain a solid material which is reslurried in a solvent with titanium tetrachloride. Again this was heated and a solid collected. Once again the solid was reslurried once again in a solution of titanium tetrachloride to obtain a catalyst.

Preparation of Intermediate Heterophasic Propylene Copolymers

Step I)

4 heterophasic propylene copolymers (E1, E2, E3, CE4)) were produced by co-polymerization of propylene and ethylene using two reactors in series. In the first reactor (temperature 60-85° C., pressure $2.2.10^1$-$3.0 \cdot 10^1$ bar), the propylene homopolymer matrix phase was prepared. After polymerization, the powder was transported from the first to the second reactor (temperature 60-85° C., pressure $2.2.10^1$-$3.0 \cdot 10^1$ bar) where the polymerization of the rubber phase consisting of an ethylene-propylene copolymer was done. Materials were prepared using the catalyst system composed of catalyst A and di(iso-propyl) dimethoxysilane (DiPDMS). Table 3 provides an overview of reactor powders E1, E2, E3 and CE4 that were prepared in this manner. MFR R1 ($MFR_{R1}$) represents the melt flow rate of the propylene homopolymer manufactured in the first reactor. Propylene homopolymers were produced at different $(H2/C3)_{R1}$ molar ratios, due to the different target melt flow rates (MFR R1). $(H2/C3)_{R1}$ is the molar ratio of hydrogen to propylene in the gas cap of the first reactor, measured by on-line gas chromatography and adjusted to reach the target MFR R1. MFR R2 ($MFR_{R2}$) represents the melt flow rate of the intermediate heterophasic propylene copolymer powder obtained after the polymerization of the rubber phase in the second reactor.

CXS and CXI represent, respectively, the amount of soluble and insoluble fractions in p-xylene at 25° C. based on the total weight of the heterophasic propylene copolymer. IV-CXS and IV-CXI represent the intrinsic viscosities of the p-xylene soluble and p-xylene insoluble fractions, respectively, measured in decaline at 135° C. according to DIN EN ISO 1628-1 and -3. The IV ratio is defined as the ratio of IV-CXS to IV-CXI.

$M_w/M_n$ is defined as the molecular weight distirbution and is measured by SEC analysis with universal calibration. RCC2 is the ethylene weight percentage of the ethylene-propylene copolymer phase measured by FTIR spectroscopy.

TABLE 3

Properties of intermediate heterophasic propylene copolymers

| Exp # | MFR R1 dg/min | $(H2/C3)_{R1}$ mol/mol | MFR R2 dg/min | CXS wt. % | IV-CXS dl/g | CXI wt. % | IV-CXI dl/g | IV ratio | $M_w/M_n$ | RCC2 wt. % |
|---|---|---|---|---|---|---|---|---|---|---|
| E1 | 15.4 | 0.021 | 4.2 | 25.1 | 2.9 | 74.9 | 1.8 | 1.66 | 6.2 | 54.1 |
| E2 | 23.5 | 0.028 | 4.8 | 28 | 2.8 | 72 | 1.6 | 1.75 | 6.3 | 43.6 |
| E3 | 30.2 | 0.036 | 3.7 | 27.7 | 4.3 | 72.3 | 1.7 | 2.61 | 9.4 | 43.7 |
| CE4 | 9.9 | 0.0175 | 4.4 | 28.3 | 2.1 | 71.7 | 1.8 | 1.20 | 5.4 | 42.3 |

Step II)

For achieving high flow propylene heterophasic copolymers, these reactor powders (the intermediate heterophasic propylene copolymer powders) were peroxide shifted (i.e. visbreaking) to higher melt flow rates to obtain the final heterophasic propylene copolymers. This was done by feeding the powder to an extruder and adding Luperco 802PP40 as a peroxide (1,4-bis(2-tert-butylperoxypropan-2-yl)benzene, CAS Registry Number: 2781-00-2) in different concentrations to achieve for each reactor powders three different final melt flow rates close to values of 10, 20 and 40 dg/min. Table 4 lists details of the visbreaking experiments for the four reactor powders (E1, E2, E3 and CE4) including starting MFR (intermediate MFR), target MFR (final MFR) and the amount of peroxide in weight percentage. Besides the peroxide, some additives common in the art were also added (0.25 weight percentage based on the total weight of the heterophasic propylene copolymer). The additive package was the same for all experiments. Table 4 also includes 4 comparative commercially available heterophasic propylene copolymers: CE5 is SABIC® PP 108MF10, CE6 is Total® PPC 7810, CE7 is LyondellBasell® Hifax CA 7378 A.

TABLE 4

MFR change

| Exp # | Intermediate MFR dg/min | Final MFR dg/min | Peroxide wt. % |
|---|---|---|---|
| E1-S10 | 4.2 | 9.8 | 0.055 |
| E1-S20 | 4.2 | 19 | 0.104 |
| E1-S40 | 4.2 | 40.7 | 0.22 |
| E2-S10 | 4.8 | 9.4 | 0.03 |
| E2-S20 | 4.8 | 16.1 | 0.07 |
| E2-S40 | 4.8 | 40.2 | 0.18 |
| E3-S10 | 3.7 | 9.4 | 0.035 |
| E3-S20 | 3.7 | 24 | 0.09 |
| E3-S40 | 3.7 | 40.6 | 0.215 |
| CE4-S10 | 4.4 | 9.1 | 0.03 |
| CE4-S20 | 4.4 | 19.8 | 0.096 |
| CE4-S40 | 4.4 | 41.2 | 0.17 |
| CE5 (108MF10) | N/A | 9.2 | N/A |
| CE6 (PPC 7810) | N/A | 13.5 | N/A |
| CE7 (CA7378A) | N/A | 12.1 | N/A |

Intermediate Heterophasic Propylene Copolymer: Mechanical Properties

Table 5 lists the material properties of the four intermediate heterophasic propylene copolymers. The three examples (E1, E2 and E3) have melt flow rate and Izod impact values at 23° C. and −20° C. similar to the comparative example CE4, whereas their flexural modulus is slightly higher which may be due to higher MFR of the PP matrix (MFR R1) and/or slightly lower CxS values.

As can be seen from Table 5, the warpage is significantly reduced in the present examples versus CE4 which is believed to be a direct consequence of the isotropic morphology of the rubber domains within the propylene matrix.

The average size of the rubber particles ($d_{50}$) is also presented in Table 5. E1-E3 display higher $d_{50}$ values than that of CE4.

TABLE 5

Material properties of the intermediate heterophasic propylene copolymer powders

| Examples | E1 | E2 | E3 | CE4 |
|---|---|---|---|---|
| MFR ISO 1133 @ 230° C. (dg/min) | 4.2 | 4.8 | 3.7 | 4.4 |
| $d_{50}$ (µm) | 1.6 | 1.36 | 1.15 | 0.67 |
| Izod impact // 23° C. (kJ/m$^2$) | 69 | 70 | 69 | 69 |
| Izod impact // −20° C. (kJ/m$^2$) | 8 | 9 | 8.5 | 6.8 |
| Flexural modulus // 23° C. (N/mm$^2$) | 960 | 855 | 865 | 845 |
| Warpage (24 hr at 23° C.) | 1.1 | 1.1 | 1.05 | 1.18 |
| Warpage (24 hr at 23° C. + 1 hr at 90° C.) | 1.1 | 1.1 | 1.05 | 1.20 |
| Average tiger stripe rating 240° C. | 7.4 | 6.3 | 7.4 | 4.8 |

The surface morphology of the heterophasic propylene copolymers is the key parameter controlling their surface aesthetics performance, the so-called tiger stripe performance. As seen in Table 5, Examples E1-E3 have much better surface aesthetics performance than CE4 with higher average tiger stripe ratings.

Final Heterophasic Propylene Copolymer with MFR of 10 dg/min: Mechanical Properties and Tiger Stripe Rating Table 6 summarizes the material properties of the final heterophasic propylene copolymers obtained after the peroxide shifting step of the intermediate heterophasic propylene copolymer powders (E1, E2, E3 and CE4) to final MFR around 10 dg/min.

TABLE 6

Material properties of the final heterophasic propylene copolymers after the peroxide shifting step of the intermediate heterophasic propylene copolymer powders to final MFR around 10 dg/min

| Examples | E1-S10 | E2-S10 | E3-S10 | CE4-S10 | CE5 |
|---|---|---|---|---|---|
| MFR ISO 1133 @ 230° C. (dg/min) | 9.8 | 9.4 | 9.4 | 9.1 | 9.2 |
| Izod impact // 23° C. (kJ/m$^2$) | 64.8 | 66.1 | 67.1 | 56.4 | 73 |
| Izod impact // −20° C. (kJ/m$^2$) | 7.5 | 7.9 | 8.4 | 5.7 | 5.9 |
| Flexural modulus // 23° C. (N/mm$^2$) | 920 | 815 | 840 | 810 | 890 |
| Warpage (24 hr at 23° C.) | 1.05 | 1.08 | 1.04 | 1.17 | 1.3 |
| Warpage (24 hr at 23° C. + 1 hr at 90° C.) | 1.06 | 1.07 | 1.03 | 1.18 | 1.33 |
| Average tiger stripe rating 240° C. | 7.7 | 7.5 | 7.9 | 5.8 | 6.4 |

As can be seen from Table 6 above, E1-S10, E2-S10, E3-S10 show that the heterophasic propylene copolymers obtainable by the process of the invention show an improved combination of good impact/modulus with an improved tiger stripe rating as well as lower warpage.

Final Heterophasic Propylene Copolymer with MFR of 20 dg/min: Mechanical Properties, Tiger Stripe Rating and Paintability Table 7 summarizes the material properties of the final heterophasic propylene copolymers obtained after the peroxide shifting step of the intermediate heterophasic propylene copolymer powders (E1, E2, E3 and CE4) to final MFR around 20 dg/min.

TABLE 7

Material properties of the final heterophasic propylene copolymers after the peroxide shifting step of the intermediate heterophasic propylene copolymer powders to final MFR around 20 dg/min

| Examples | E1-S20 | E2-S20 | E3-S20 | CE4-S20 | CE6 | CE7 |
|---|---|---|---|---|---|---|
| MFR ISO 1133 @ 230° C. (dg/min) | 19 | 16.1 | 20.4 | 19.8 | 13.5 | 12.1 |
| d$_{50}$ (μm) | 1.42 | 1.12 | 1.03 | 1.05 | | |
| Izod impact // 23° C. (kJ/m$^2$) | 62.9 | 64 | 62.9 | 49.4 | 60.2 | 37.3 |
| Izod impact // −20° C. (kJ/m$^2$) | 7 | 7.4 | 7 | 5.6 | 8.0 | 8.8 |
| Flexural modulus // 23° C. (N/mm$^2$) | 870 | 800 | 810 | 780 | 950 | 1250 |
| Warpage (24hr at 23° C.) | 1.01 | 1.02 | 1.01 | 1.12 | 1.04 | 1.08 |
| Warpage (24hr at 23° C. + 1 hr at 90° C.) | 1.02 | 1.02 | 1.0 | 1.12 | 1.06 | 1.1 |
| Average tiger stripe rating 240° C. | 8.0 | 7.8 | 8.1 | 6.9 | 7.0 | 7.0 |
| Paintability performance | ++ | + | ++ | −− | − | − |

As can be seen from Table 7 above, E1-S20, E2-S20, E3-S20 show that the heterophasic propylene copolymers obtainable by the process of the invention show an improved combination of high flow while preserving impact and flexural modulus (stiffness) with a very good tiger stripe rating, as well as a low warpage and a very good paint adhesion (paintability performance).

Final Heterophasic Propylene Copolymer with MFR of 40 dg/min: Mechanical Properties and Tiger Stripe Rating Table 8 summarizes the material properties of the final heterophasic propylene copolymers obtained after the peroxide shifting step of the intermediate heterophasic propylene copolymer powders (E1, E2, E3 and CE4) to final MFR around 40 dg/min.

TABLE 8

Material properties of the final heterophasic propylene copolymers after the peroxide shifting step of the intermediate heterophasic propylene copolymer powders to a final MFR around 40 dg/min

| Examples | E1-S40 | E2-S40 | E3-S40 | CE4-S40 |
|---|---|---|---|---|
| MFR ISO 1133 @ 230° C. (dg/min) | 40.7 | 40.2 | 40.6 | 41.2 |
| Izod impact // 23° C. (kJ/m$^2$) | 56.5 | 61.21 | 58.4 | 45.5 |
| Izod impact // −20° C. (kJ/m$^2$) | 6.9 | 6.4 | 6.3 | 5.3 |
| Flexural modulus // 23° C. (N/mm$^2$) | 820 | 750 | 760 | 730 |
| Warpage (24 hr at 23° C.) | 0.99 | 1.0 | 0.99 | 1.05 |
| Warpage (24 hr at 23° C. + 1 hr at 90° C.) | 0.99 | 1.0 | 0.98 | 1.06 |
| Average tiger stripe rating 240° C. | 8.2 | 8.2 | 8.5 | 7.3 |

As can be seen from Table 8, E1-S40, E2-S40, E3-S40 show that by process of the invention heterophasic propylene copolymers are obtained, which heterophasic propylene copolymers have a high flow in combination with a good flexural modulus (stiffness), a high impact, a very good tiger stripe rating and an excellent (around 1) warpage.

CONCLUSION

To summarize the findings presented in Tables 6, 7 and 8: with the process of the invention heterophasic propylene copolymers are obtained, which heterophasic propylene copolymers have a medium to high flow and which heterophasic propylene copolymers show a good balance of impact-stiffness, a good tiger stripe rating, low warpage and excellent paint adhesion. It is also shown that the heterophasic propylene copolymers of the examples have a tough impact behavior at room temperature (Izod impact at 23° C. of above 35 kJ/m$^2$).

This makes the heterophasic propylene copolymers of the invention suitable for the production of (injection molded) articles, for example for (injection molded) automotive parts, for example for (injection molded) automotive exterior parts, such as a bumper or a body part.

The invention claimed is:

1. Process for the preparation of a final heterophasic propylene copolymer having a final melt flow rate of 9 to 80 dg/min as measured according to ISO1133 at 230° C. and 2.16 kg, comprising:

visbreaking an intermediate heterophasic propylene copolymer having an intermediate melt flow rate, which intermediate melt flow rate is lower than the final melt flow rate, to obtain the final heterophasic propylene copolymer, wherein the intermediate heterophasic propylene copolymer consists of
(a) a propylene-based matrix,
wherein the propylene-based matrix consists of a propylene homopolymer and/or a propylene-α-olefin copolymer prepared from at least 90 wt % of propylene and at most 10 wt % of α-olefin, based on the total weight of the propylene-based matrix, and
(b) a dispersed ethylene-α-olefin copolymer,
wherein the sum of the total amount of propylene-based matrix and total amount of the dispersed ethylene-α-olefin copolymer in the intermediate heterophasic propylene copolymer is 100 wt %, based on the intermediate heterophasic propylene copolymer,
wherein the dispersed ethylene α-olefin copolymer has an average rubber particle size $d_{50}$ of 1.0-2.0 μm as determined by scanning electron microscopy, and
wherein the intermediate heterophasic propylene copolymer has
a fraction insoluble in p-xylene at 25° C. (CXI) in the range of 65 to 77 wt %, based on the intermediate heterophasic propylene copolymer, and
a fraction soluble in p-xylene at 25° C. (CXS) in the range of 23 to 35 wt. % based on the intermediate heterophasic propylene copolymer,
wherein the CXS has an intrinsic viscosity of at least 2.6 dl/g,
wherein the sum of the total amount of CXI and total amount of CXS in the intermediate heterophasic propylene copolymer is 100 wt. %,
wherein the ratio of the intrinsic viscosity of the CXS (IV-CXS) to the intrinsic viscosity of the CXI (IV-CXI) is in the range from 1.5 to 4.5 dl/g, and
wherein the intrinsic viscosity is determined according to DIN EN ISO 1628-1 and 1628-3.

2. The process according to claim 1, wherein the propylene-based matrix consists of a propylene homopolymer.

3. The process according to claim 1, wherein the intrinsic viscosity of the CXI (IV-CXI) is in the range of 0.50 to 3.5.

4. The process according to claim 1, wherein the amount of ethylene in the ethylene-α-olefin copolymer of the intermediate heterophasic propylene copolymer as measured by Fourier Transform Infrared Spectroscopy) is from 30 to 65 wt %, and/or wherein the α-olefin in the ethylene-α-olefin copolymer is propylene.

5. The process according to claim 1, wherein the intermediate heterophasic propylene copolymer used in the process of the invention has a CXS in the range from 25 to 32 wt % based on the intermediate heterophasic propylene copolymer.

6. The process according to claim 1, wherein melt flow rate of the intermediate heterophasic propylene copolymer is in the range of 3.0 to 8.0 dg/min as measured according to ISO1133 (2.16 kg/230° C.).

7. The process according to claim 1, wherein the intermediate heterophasic propylene copolymer has molecular weight distribution (Mw/Mn) in the range from 5.8 to 10.0, wherein Mw stands for the weight average molecular weight and Mn stands for the number average molecular weight are measured by SEC analysis.

8. The process according to claim 1, wherein the final melt flow rate of the final heterophasic propylene copolymer is in the range from 9 to 45 dg/min, as determined using ISO 1133 (230° C., 2.16 kg).

9. The process according to claim 1, wherein the shifting ratio, which is the ratio of the final melt flow rate to the intermediate melt flow rate is in the range from 1.5 to 20.

10. The process according to claim 1,
wherein the intrinsic viscosity of the CXI (IV-CXI) is in the range of 1.0 to 2.5,
wherein the amount of ethylene in the ethylene-α-olefin copolymer of the intermediate heterophasic propylene copolymer as measured by Fourier Transform Infrared Spectroscopy) is from 40 to 55 wt %, and
wherein the final melt flow rate of the final heterophasic propylene copolymer is in the range from 9 to less than 40 dg/min as determined using ISO 1133 (230° C., 2.16 kg).

11. The process according to claim 10, wherein the propylene-based matrix consists of a propylene homopolymer, and wherein the α-olefin in the ethylene-α-olefin copolymer is propylene.

12. The process according to claim 1, wherein the intermediate heterophasic propylene copolymer used in the process has a CXS in the range from 25 to 32 wt % based on the intermediate heterophasic propylene copolymer,
wherein melt flow rate of the intermediate heterophasic propylene copolymer is in the range of 3.0 to 8.0 dg/min as measured according to ISO1133 (2.16 kg/230° C.),
wherein the intermediate heterophasic propylene copolymer has molecular weight distribution (Mw/Mn) in the range from 6.0 to 9.5, wherein Mw stands for the weight average molecular weight and Mn stands for the number average molecular weight are measured by SEC analysis, and
wherein the shifting ratio, which is the ratio of the final melt flow rate to the intermediate melt flow rate is in the range from 2 to 10.

* * * * *